(12) United States Patent
Andersen

(10) Patent No.: US 12,085,835 B2
(45) Date of Patent: Sep. 10, 2024

(54) LIGHT SOURCE

(71) Applicant: NKT PHOTONICS A/S, Birkerød (DK)

(72) Inventor: Thomas Vestergaard Andersen, Birkerød (DK)

(73) Assignee: NKT PHOTONICS A/S, Birkerød (DK)

( * ) Notice: Subject to any disclaimer, the term of this patent is extended or adjusted under 35 U.S.C. 154(b) by 79 days.

(21) Appl. No.: 17/786,904

(22) PCT Filed: Dec. 21, 2020

(86) PCT No.: PCT/DK2020/050403
§ 371 (c)(1),
(2) Date: Jun. 17, 2022

(87) PCT Pub. No.: WO2021/121530
PCT Pub. Date: Jun. 24, 2021

(65) Prior Publication Data
US 2023/0023430 A1    Jan. 26, 2023

(30) Foreign Application Priority Data

Dec. 19, 2019    (DK) .............................. PA201970800

(51) Int. Cl.
*G02F 1/365* (2006.01)
*G01J 3/10* (2006.01)
(Continued)

(52) U.S. Cl.
CPC ................ *G02F 1/365* (2013.01); *G01J 3/10* (2013.01); *H01S 3/0092* (2013.01); *H01S 3/10046* (2013.01); *H01S 3/1301* (2013.01)

(58) Field of Classification Search
CPC .... G02F 1/365; G02F 1/3528; G02F 2201/20; G02F 2201/205; G01J 3/10;
(Continued)

(56) References Cited

U.S. PATENT DOCUMENTS 7,982,943 B2    7/2011  Okuno
8,902,495 B2    12/2014 Clowes et al.
(Continued)

FOREIGN PATENT DOCUMENTS

EP    1925975 A1    5/2008
EP    2953215 A1    12/2015
(Continued)

OTHER PUBLICATIONS

Danish Search Report dated Jun. 22, 2020 issued by the Danish Patent and Trademark Office in corresponding Patent Application No. PA 2019 70800. (9 pages).
(Continued)

*Primary Examiner* — Tarifur R Chowdhury
*Assistant Examiner* — Carlos Perez-Guzman
(74) *Attorney, Agent, or Firm* — Boone IP Law

(57) ABSTRACT

A light source including: a pulse generator for providing a first sequence of light pulses, the first sequence of light pulses including a first number of light pulses within a predetermined time period, a manipulator configured to generate a second sequence of light pulses from the first sequence of light pulses, the second sequence of light pulses having a second number of light pulses within the predetermined time period, the second number being different from the first number, and a nonlinear optical element arranged to receive the second sequence of light pulses.

20 Claims, 6 Drawing Sheets

(51) Int. Cl.
*H01S 3/00* (2006.01)
*H01S 3/10* (2006.01)
*H01S 3/13* (2006.01)

(58) Field of Classification Search
CPC .. H01S 3/0092; H01S 3/10046; H01S 3/1301; H01S 3/005; H01S 3/1003; H01S 3/06754; H01S 3/06758; H01S 3/0085
See application file for complete search history.

(56) References Cited

U.S. PATENT DOCUMENTS

| | | | |
|---|---|---|---|
| 2005/0226576 A1* | 10/2005 | Feder | G02F 1/365 385/122 |
| 2009/0095890 A1 | 4/2009 | Tanaka | |
| 2009/0097512 A1 | 4/2009 | Clowes et al. | |
| 2011/0062127 A1 | 3/2011 | Gu et al. | |
| 2011/0116282 A1 | 5/2011 | Okuno | |
| 2013/0177031 A1 | 7/2013 | Almeida et al. | |
| 2014/0204456 A1 | 7/2014 | Chavez-pirson et al. | |
| 2015/0192732 A1 | 7/2015 | Moselund | |
| 2017/0131556 A1* | 5/2017 | Salama | H01S 3/2232 |
| 2018/0217323 A1 | 8/2018 | Lyngsø~e et al. | |
| 2019/0103721 A1 | 4/2019 | Ni | |
| 2019/0267767 A1* | 8/2019 | Krausz | H01S 3/2383 |
| 2022/0149579 A1* | 5/2022 | Yusim | H01S 3/2308 |
| 2022/0247143 A1* | 8/2022 | Abdolvand | H01S 3/094038 |
| 2022/0337017 A1* | 10/2022 | Michailovas | H01S 3/0057 |
| 2023/0023430 A1 | 1/2023 | Andersen | |
| 2023/0033071 A1 | 2/2023 | Andersen | |

FOREIGN PATENT DOCUMENTS

| | | |
|---|---|---|
| JP | 2007193230 A | 8/2007 |
| WO | 2011146407 A2 | 11/2011 |
| WO | 2013104029 A1 | 7/2013 |
| WO | 2013178232 A1 | 12/2013 |

OTHER PUBLICATIONS

Danish Search Report dated Jun. 12, 2020, issued by the Danish Patent and Trademark Office in corresponding Danish Patent Application No. PA 2019 70801. (9 pages).

Danish Search Report dated Jun. 15, 2020 issued by the Danish Patent and Trademark Office in corresponding Danish Patent Application No. PA 2019 70802. (10 pages).

International Search Report (PCT/ISA/210) and Written Opinion (PCT/ISA/237) mailed on Mar. 24, 2021, by the European Patent Office as the International Searching Authority for International Application No. PCT/DK2020/050403. (15 pages).

International Search Report (PCT/ISA/210) and Written Opinion (PCT/ISA/237) mailed on Mar. 26, 2021, by the European Patent Office as the International Searching Authority for International Application No. PCT/DK2020/050404. (14 pages).

International Search Report (PCT/ISA/210) and Written Opinion (PCT/ISA/237) mailed on Mar. 30, 2021, by the European Patent Office as the International Searching Authority for International Application No. PCT/DK2020/050402. (13 pages).

U.S. Appl. No. 18/736,889, Thomas Vestergaard Andersen, filed Jun. 7, 2024.

First Examination Report mailed on Jul. 1, 2024, by the European Patent Office for European Application No. (P288453EP00), 8 pages.

* cited by examiner

LIGHT SOURCE

The present invention relates to a light source, such as, for example, a broadband light source or a supercontinuum light source.

A broadband light source generally refers to a light source that emits light having a broad bandwidth of wavelengths, for example, 50 nm or more. Broadband light sources can for example include incandescent or fluorescent lamps, providing a broad spectrum, typically in the range of 400 nm to 1700 nm. For such sources, however, the intensity is limited by the quality of the filament employed or the efficiency of the gas excitation. Furthermore, as the light is not spatially coherent, coupling the light into a fiber might be challenging, resulting in a low-power, low-brightness source with mediocre quality. One or more of the foregoing limitations can be less than optimal for many applications.

Supercontinuum generation is able to provide improvement over one or more of the above limitations. Supercontinuum generation relates to the formation of a broad, typically continuous spectrum through propagation of high-power light, typically pulses, through a nonlinear element, such as a nonlinear fiber. The term supercontinuum does not cover a specific phenomenon but rather can include at least some of a plethora of nonlinear effects, such as self-phase modulation, Raman scattering, phase matching and soliton generation, leading to considerable broadening of optical pulses. The spectrum achieved through supercontinuum generation in a nonlinear optical fiber typically covers a broader spectrum, for example in some instances with wavelengths in the range of 400-2400 nm, with respect to incandescent or fluorescent lamps, and can provide one or more of higher intensity, single-mode beam characteristics, excellent pointing stability and the brightness of a laser.

A common form of a broadband or supercontinuum light source comprises an ultrashort pulse optical pump source operating at a pump wavelength in the infrared region of the spectrum and a highly nonlinear microstructured optical with specially designed dispersion properties.

Light sources, in particular light sources that can provide broadband supercontinuum light, are ideal light sources for many applications, for example within biomedical imaging, component characterization, manufacturing control and material processing. Broadband light or supercontinuum sources also find applications in fields such as spectroscopy, Optical Coherence Tomography (OCT), metrology, scientific instrumentation, bio-imaging, semiconductor inspection and many more. For some applications, for example in material processing, it may also be desirable to have a broadband or a supercontinuum light source which is able to provide broadband or supercontinuum light at a high power.

It is therefore an object of the present invention to provide a light source which is able to deliver broadband or even supercontinuum light at a relatively high-power level.

It is also an object of the present invention to provide a light source which can circumvent or at least reduce light induced degradation of a nonlinear optical element used for broadband or supercontinuum generation.

The object is satisfied by a light source in accordance with the features of claim 1. Preferred embodiments of a light source in accordance with the present invention are disclosed in the dependent claims.

In accordance with the present invention, a light source comprises a pulse generator for providing a first sequence of light pulses, the first sequence of light pulses comprising a first number of light pulses within a predetermined time period. The light source also comprises a manipulator configured to generate a second sequence of light pulses from the first sequence of light pulses, the second sequence of light pulses having a second number of light pulses within the predetermined time period, and the second number of light pulses being different from the first number of light pulses. The light source also comprises a nonlinear optical element arranged to receive the second sequence of light pulses.

The nonlinear optical element can in particular be configured to generate broadband light pulses or even supercontinuum light pulses from the pulses of the second sequence of light pulses.

The light source may comprise a broadband light source or a supercontinuum light source.

The manipulator can be an optical device, in particular a completely fiber-based optical device, that changes the number of light pulses that are present in the first sequence of light pulses within the predetermined time period. In particular, the manipulator can increase the number of pulses to be greater than the number present in the first sequence of light pulses, thereby generating the second sequence of light pulses having an increased number of pulses within the predetermined time period.

Degradation of the nonlinear optical element in response to pulses generating the broadband spectrum while propagating through the element is usually a continuous process. A high peak power or energy of pulses transmitted through the nonlinear optical element causes a higher degradation than pulses having a low peak power. The degradation rate can be nonlinear, so that a high peak power can cause severe damage or degradation to the nonlinear optical element.

The output power of a supercontinuum light source can be increased by increasing the power of the pulses delivered to the nonlinear optical element for generating the supercontinuum. However, with increased power and in particular increased peak power of the pulses follows the accelerated material degradation in the nonlinear optical element. Increasing the power of the pulses thus reduces the lifetime of the nonlinear material and hence the light source. There is hence often a limit to how powerful a supercontinuum can be generated without reducing the fiber and hence laser lifetime significantly.

It is hence a problem to provide a supercontinuum laser providing high-power output without sacrificing the lifetime of the nonlinear optical element and thus of the laser. The current invention provides as a solution that the optical power delivered as light pulses to the nonlinear optical element is distributed over an increased number of pulses, thereby increasing the total optical power received by the nonlinear optical element while keeping the pulse peak power below a predefined maximum level. This level may e.g. be defined from the onset of accelerated fiber degradation in response to the pulses.

In particular, having an increased number of pulses per predetermined time period in the second sequence of light pulses allows for keeping the peak power of the pulses received by the nonlinear optical element below a predefined maximum level while still providing a higher total optical power input to the nonlinear optical element during that period. Thereby a high-power supercontinuum output of light from the nonlinear optical element can be obtained without accelerated degradation of the material of the nonlinear optical element. Furthermore, the obtained supercontinuum light can have a high spectral power density and/or a high spectral energy density.

An advantage of at least some embodiments of the current invention and the distribution of the pulse power over several pulses is that an increased accumulated power can be delivered to the nonlinear optical element within the predetermined time period without the need for exposing the nonlinear optical element to short high-intensity pulses with extreme peak powers, whereby an accelerated degradation of the material of the nonlinear element is prevented. The increased accumulated power can be provided by several pulses occurring shortly one after the other in a train of pulse. Each of the pulses of such a pulse train can have peak powers, which are too low to damage the nonlinear optical element but still sufficiently high to generate a supercontinuum when propagating through the nonlinear element. A supercontinuum spectrum can be detected by a detector which has a sufficiently long integration time so that the individual spectra generated from the individual pulses of the pulse train cannot be resolved. The detected supercontinuum spectrum can have a high power and/or a high spectral power density over a large wavelength range, which can for example span over the complete visible range.

Consequently, as the second sequence of light pulses includes more pulses per predetermined time period than the first sequence of light pulses, the power of the light output from the nonlinear optical element can be higher without causing accelerated degradation of the nonlinear optical element.

In some embodiments, the energy or peak power of selected pulses can be controlled. For example, the peak power or energy of pulses fed into the nonlinear optical element can be controlled to a level which is below a predefined threshold level, i.e. below a predefined maximum level. The maximum level could be chosen such that a damage or a degradation of the nonlinear optical element does not occur or is reduced, such as reduced to an acceptable level. In other words, the predefined maximum level is set such that for peak powers and energies below this level, the degradation of the nonlinear optical element is maintained at a sufficiently low magnitude to ensure a long life time of the nonlinear optical element and hence the light source. Thus, having more pulses with a peak power below the predefined maximum level per predetermined time period in the second sequence of light pulses can help to increase the lifetime of the nonlinear optical element and to avoid damaging the nonlinear optical element, while a high-power output and/or a high spectral energy density can be obtained.

The peak power or energy of selected pulses could be controlled to be "clamped" so as to not exceed a threshold value, which can correspond to the predefined maximum level. That is, the peak power or pulse energy could vary, such as, for example, as the number of pulses per unit time varies (to a certain extent such variation is natural when pulses are amplified; fewer pulses per unit time can mean more energy, and hence peak power, per pulse), but not allowed to vary to exceed the threshold value. Also, the peak power or energy of pulses could be controlled to remain substantially the same, even as the number of pulses per unit time is varied. For example, as supercontinuum generation is responsive to the peak power, it can be advantageous to have the peak power remain the same as well as clamped below a threshold value selected to reduce damage to the nonlinear element, where absent control or clamping the peak power or energy would be undesirably large.

The manipulator might be configured to generate, from the first sequence of light pulses having a first repetition rate, the second sequence of light pulses with a second repetition rate which is higher than the first repetition rate. The manipulator can for example be configured to double the repetition rate of the pulses in the second sequence of light pulses with respect to the repetition rate of the pulses in the first sequence of light pulses.

The manipulator might be configured to generate two or more pulses or a burst of pulses with a time delay in between the pulses from a single pulse of the first sequence of light pulses. Thus, the manipulator might be able to generate a plurality of pulses from a single pulse in the first sequence of light pulses. The plurality of light pulses may have a very short time delay in between consecutive pulses. A sequence of such pulses, when sent through the nonlinear element, might result in the generation of a high-power broadband or supercontinuum output with less degradation of the nonlinear optical element, while the output light can provide high power broadband or supercontinuum pulses with a high spectral power density over a large wavelength region, for example a wavelength region that extends over the visible range.

In some embodiments, the intra-pulse temporal spacing between the pulses in a burst may be shorter than 200 ps, such as lower than 100 ps, such as 10 ps. The intra-pulse temporal spacing may be larger than 1.5 times the width of the pulses in the burst, such as 5 times the width of the pulses in the burst, such as 10 times the width of the pulses in the burst, such as 20 to 25 times width of the pulses in the burst.

The manipulator may comprise a pulse splitter configured to split each pulse of the first sequence of light pulses into a given number N of pulses, thereby generating N sub-sequences of light pulses including a first sub-sequence of light pulses and N-1 further sub-sequences of light pulses, and the manipulator may be configured to individually delay each of the N-1 sub-sequences of light pulses with respect to the first sub-sequence of light pulses. The number N may be a natural number. N may be equal or greater than 2.

The manipulator may comprise a pulse combiner which is configured to combine the first sub-sequence of light pulses and the individually delayed N-1 sub-sequences of light pulses, thereby generating the second sequence of light pulses. The second sequence of light pulses may therefore be generated by a combination or superposition of the N sub-sequences of light pulses after the N-1 sub-sequences of light pulses have been delayed with respect to the first sub-sequence of light pulses.

The manipulator may comprise N optical paths of different optical lengths, wherein the pulse splitter is configured to feed each of the N sub-sequences of light pulses into one of the N optical paths. Thereby, each of the N sub-sequences of light pulses travels along one of the optical paths. Due to the different optical lengths of the paths, each of the N-1 sub-sequences is delayed individually with respect to the first sub-sequence of light pulses which may be fed into the shortest optical path.

The optical paths might be formed by optical fibers. Each of the optical fibers may have a predetermined length causing a predetermined time delay on a pulse that travels through the respective fiber.

The pulse generator may comprise an optical pump source, for example a pulsed laser. The pulses output from the pump source can be nanosecond, picosecond or femtosecond pulses. The center wavelength of the pulses may be in the infrared, for example, at least approximately, at a wavelength of 1064 nm. In some embodiments, the center wavelength of the pulses is in the range of 1020 to 1080 nm. In some embodiments, the center wavelength is at a wavelength of 1550 nm±40 nm. In some embodiments, the center wavelength is in the range of 1850 to 2050 nm.

The pulse generator may include at least one amplifier. The amplifier may serve to amplify the light pulses emitted by the optical pump source.

The pulse generator may comprise a pulse picker. For example, an acousto-optical or electro-optical modulator may be used as pulse picker. The pulse picker may be configured to selectively pick pulses and may thereby reduce the repetition rate of an initial sequence of light pulses emitted by the optical pump source of the pulse generator. The pulse picker can be advantageous for generating the first sequence of light pulses from the initial sequence of light pulses. By reducing the repetition rate in the first sequence of light pulses a sufficient or desired time spacing between different bursts of pulses in the second sequence of light pulses, which is generated based on the first sequence of light pulses, can be ensured.

At least one amplifier can be arranged before the nonlinear optical element for amplifying the pulses of the second sequence of light pulses. Thus, the pulses of the second sequence of light pulses which are provided to the nonlinear optical element may be amplified pulses.

In some embodiments, the amplifier is configured to amplify the pulses of the second sequence of pulses such that the peak power of the pulses fed to the nonlinear element remains below the predefined power threshold level. The level can be set such that a damage of the nonlinear optical element can be avoided or is reduced. In combination with the increased number of pulses in the second sequence, this amplification provides that the total accumulated optical power received by the nonlinear optical element is increased, and thereby the power of the generated supercontinuum, while avoiding pulses having a peak power which exceeds the predefined power threshold level. Thereby a high-power supercontinuum light source with maintained lifetime can be realized. Furthermore, the high-power supercontinuum light can have a high spectral power density over a large wavelength region, which can for example extend over the complete visible range.

As noted above, in some embodiments the peak power or energy of pulses can be controlled to remain substantially the same and/or to not to exceed a selected threshold. Control can be desirable where, as in the present invention, the number of pulses per unit time can vary. For example, the present invention can include one or more amplifiers. Amplifiers are typically optically pumped, such as by laser diodes, to provide for energy to transfer to the light signal to amplify the signal. Very often reducing the number of pulses amplified per unit time tend to increase the energy or peak power per pulse, as the amount of energy of optical pump power delivered over the time interval is now distributed over fewer amplified pulses.

Accordingly, one way to control the optical energy or peak power of a pulse, whether for compensating for variations due to the amplifier itself or responsive to other considerations, is to control the amplification process, such as, for example, controlling the pump laser or lasers pumping the amplifier(s). For example, the optical pump power can be reduced when fewer pulses are being amplified to compensate for the typical increase in amplified pulse energy or peak power. A variable optical attenuator or a modulator, such as an AOM (acousto optic modulator) or and EOM (electro optic modulator) could be used, in some embodiments, to control the peak power or energy of pulses. Control of the AOM or EOM could be in conjunction with the control of amplification.

In some embodiments, the light source comprises a detector for detecting, in particular sampling, at least a portion of the light pulses of the second sequence of light pulses before it is input into the nonlinear optical element. At least one parameter of the second sequence of light pulses can be controlled based on a signal obtained from the detector. For example, the peak power of the pulses in the second sequence can be controlled based on the detector signal. Thus, the light source can be configured for sampling pulses, for example sampling pulses using a detector. Pulses to be delivered to the nonlinear element can be sampled prior to their delivery, and control can be responsive to the sampled pulse energy or peak power of pulses or of a burst of pulses (e.g., where a detector is not responsive to individual pulses). It can also be possible to control the peak power or energy of the pulses responsive to a look up table, or to a formula or algorithm, or responsive to selected operation of the light source. Such control can be in conjunction with, or independent of, the aforementioned feedback control using a detector.

Regarding operation of the light source, pulses can be controlled responsive to the operation of a manipulator or modulator, such as responsive to pulse picking selected pulses. Depending on the application, any pulses of the light source can be sampled and/or controlled, such as, for example, pulses from an optical source, the initial sequence of pulses, the first or second sequence of pulses, etc. The light source can include a controller (not shown) in appropriate communication with one or more of the aforementioned elements or components for providing the desired control.

In some embodiments, the light source comprises a broadband or supercontinuum source that generates broadband or supercontinuum light.

The light source can comprise a controller for controlling operation of at least one controllable element of the light source based on a signal obtained from a detection of a portion of the first sequence of light pulses or the second sequence of light pulses. The controllable element can be one of the following: the pulse generator, an amplifier between the manipulator and the nonlinear optical element, an amplifier of the pulse generator, a pulse picker between an optical pump source of the pulse generator and the manipulator. The invention also relates to a light source kit, comprising a light source in accordance with the present invention in which the manipulator is a first manipulator which is arranged in a first module that is removable from the light source, wherein the light source kit further comprises at least a second manipulator which is configured to generate a third sequence of light pulses from the first sequence of light pulses, and wherein the second manipulator is arranged in a second module that is configured to replace the first module after removal of the first module from the light source.

The invention also relates to an apparatus for illuminating a material sample, in particular for optical analysis of a material sample, comprising a light source in accordance with the present invention, and a holder for a material sample, the holder being configured to hold the material such that, in use of the light source, the material sample is illuminated with broadband or supercontinuum light emitted from the nonlinear optical element of the light source.

The invention also relates to a spectroscopic system and/or an apparatus for carrying out spectroscopy on a sample, including a light source in accordance with the present invention for illuminating the sample with broadband or supercontinuum light and at least one detector for detecting light from the sample. The integration time of the detector preferably exceeds the time duration of a pulse and/or of a burst of pulses. The integration time of the detector can exceed the predetermined time period. Thus, the detector does not "see" the structure of a pulse or burst, but detects several supercontinuum pulses of a burst of as one pulse. The optical power provided in a burst as a whole is therefore detectable such that the detector effectively records a single spectrum from the supercontinua generated by the individual pulses in the burst as a spectrum from a single high-power supercontinuum. This is in particular advantageous for the detection of lower power signals. The integration time preferably does not include more than one burst. The at least one detector is then preferably activated synchronous with the light source, such that the detector is active when receiving the burst of pulses.

In some embodiments, the integration time can include more than one burst, that is, can be greater than the time between two bursts. Alternatively, the integration time can exceed the time duration of a pulse, but be less than the time duration of a burst of pulses.

The spectroscopic system for example can be used for analyzing dense or thick materials. Often such materials have a very strong absorption such that only very weak signals are transmitted through the material unless a high-power light source is used to illuminate the material. A spectroscopic system utilizing the disclosed light source provides that dense materials can be analyzed without the need for operating the light source in a mode with accelerated laser degradation.

At least in some embodiments, generated supercontinuum light can include a total power of at least 0.5 W, 1 W, 2 W, 5 W, 10 W in the visible wavelength range from approximately 350 nm to 850 nm.

At least in some embodiments, supercontinuum light with a high power spectral density, for example of 1 mW/nm, or 2 mW/nm, or 5 mW/nm, or 10 mW/nm, or 20 mW/nm, measured at least over a range of 10 nm within the "visible range", in particular between 350 to 850 nm, can be provided.

At least in some embodiments, the supercontinuum light source can deliver a power spectral density of more than 10 mW/nm, such as more than 20 mW/nm, such as more than 25 mW/nm, such as more than 50 mW/nm measured over at least a range of 10 nm within the part of the supercontinuum spectrum extending from at least 1200 nm up to at least 1300 nm.

The invention also relates to an apparatus for illuminating a material sample, in particular for material processing, comprising a light source in accordance with the present invention, and a holder for a material sample, the holder being configured to hold the material such that, in use of the light source, the material sample is illuminated with broadband or supercontinuum light emitted from the nonlinear optical element of the light source.

The invention also relates to a system for optical analysis of an object and/or a system for optical measurement of at least one parameter of an object.

In some embodiments, the system for optical analysis and/or measurement comprises:
 a light source according to one of the embodiments, where the light source is arranged to illuminate the object;
 a detector for detecting light received from the illuminated objects; and
 an analyzer arranged to analyze the detected light and to derive therefrom at least one parameter of the object.

Broadband light sources, such as supercontinuum light sources, that provide a spectrally broad continuum source are useful in many systems for optical analysis and measurements, such as systems configured for optical coherence tomography (OCT), white-light interferometry, spectroscopy, optical frequency metrology, fluorescence microscopy, fluorescence lifetime measurements (FLIM), hyper-spectral imaging, flow cytometry, coherent anti-Stokes Raman scattering (CARS) microscopy and two-photon fluorescence microscopy.

In some embodiments, the system is a reflection mode measurement system arranged to measure light reflected from the analyzed object, such as a system based on white light interferometry, such as Optical Coherence Tomography (OCT). Advantageously, the system is based on time domain, frequency domain or swept source OCT.

In applications where the light interrogates sub-surface regions of the analyzed object, e.g. in OCT analysis of a patient's skin or eyes, the higher power provides that deeper parts of the object can be interrogated within the same duration or that faster analysis is provided In an embodiment, the system for optical analysis is configured for in vivo, ex vivo and/or in vitro measurements of parts of the human or animal body.

The system can be applied for different ophthalmic analysis and treatments, such as for diagnosis of Age-related macular degeneration (AMD), diabetic retinopathy or glaucoma. In some embodiments, the system is used for diagnosis in connection with treatment to correct refractive eye corrections, such as e.g. laser eye surgery to correct refractive eye conditions (LASIK). In some embodiments, the system is used for measuring the boundaries of the Bowman layer inside a human eye.

In some embodiments, the system is used for product characterization and/or sorting and/or quality inspection. The higher power of the broadband light source allows for larger interrogation volume defined from a larger interrogation area and/or depth and/or faster optical analysis of the products.

In an embodiment, the measuring system is used for analysis of semiconductor materials, e.g. nitride-containing materials, and quality inspection.

The invention also relates to a method for optical measurement at least one parameter on an object to be measured. In some embodiments, the method for measuring comprises:
 providing a measurement system according to one of the embodiments;
 illuminating the object to be analyzed with at least part of the broadband spectrum generated by the light source of the measurement system;
 detecting light from said object by a detector; and
 analyzing the detected light to derive therefrom at least one parameter of the object.

In some embodiments, the illuminating and detection steps are executed simultaneously. This may e.g. be the case when the system is configured for OCT measurements or absorption spectroscopy where the object's optical response to the received light is instantaneous.

In some embodiments, the detection step is executed after the illuminating step. This may e.g. be the case when the system is configured for fluorescence measurements where the object's optical fluorescent response to the received light is slightly delayed.

The invention also relates to a spectroscopic system and/or an apparatus for carrying out spectroscopy on a sample, including a light source in accordance with the present invention for illuminating the sample with broadband or supercontinuum light and at least one detector for detecting light from the sample. The integration time of the detector preferably exceeds the time duration of a pulse and/or of a burst of pulses. The detector therefore does not "see" the structure of the pulse or burst. However, a burst as a whole is detectable. This is in particular advantageous for the detection of lower power signals. The integration time preferably does not include more than one burst. In some embodiments, the integration time can include more than one burst, that is, can be greater than the time between bursts. The integration time can exceed the time duration of a pulse but be less than the time duration of a burst of pulses.

The spectroscopic system for example can be used for analyzing dense or thick materials.

Preferred embodiments of the present invention will now be described by way of example only and with reference to the accompanying drawings in which.

Figure 1:
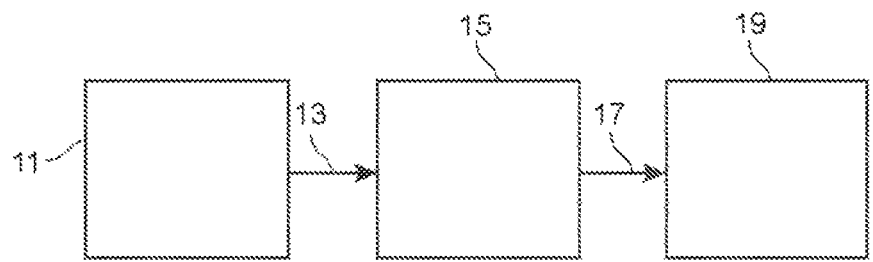
FIG. 1 shows schematically a first example of a light source according to an embodiment.

The light source of FIG. 1 comprises a pulse generator 11 for providing a first sequence 13 of light pulses. The first sequence 13 of light pulses comprises a first number of light pulses within a predetermined time period.

The light source of FIG. 1 also comprises a manipulator 15 which can receive the first sequence 13 of light pulses. The manipulator 15 is configured to generate a second sequence 17 of light pulses from the first sequence 13 of light pulses. The second sequence 17 of light pulses comprises a second number of light pulses within the predetermined time period. The second number is different from the first number.

The second sequence 17 of light pulses is provided to a nonlinear optical element 19. The nonlinear optical element 19 can for example be a nonlinear optical fiber, such as a microstructured optical fiber, and the nonlinear optical element 19 can be configured to generate a sequence of broadband or supercontinuum light pulses from the second sequence 17 of light pulses.

Microstructured optical fibers are known in the art. Generally, a microstructured fiber comprises an array of longitudinally extending features, where one or more of the features have a refractive index that is different from material surrounding the features. The array of features acts to guide the light propagated by the fiber. The microstructured optical fiber includes a core region and a cladding region, where the cladding region typically comprises the array of features, and the features typically comprise voids. Different types of microstructured fibers can operate by different physical mechanisms; for example, in some microstructured fibers the longitudinally extending array of features provides a photonic bandgap such that light cannot exist in the cladding and is therefore confined to the core; in other microstructure fibers the longitudinally extending array of features provides an index guiding mechanism for confining light to the core, akin to total internal reflection of a conventional fiber. Microstructured fibers may rely on other mechanisms as well. Microstructure fibers may have hollow or solid cores. A photonic bandgap type microstructured fiber, for example, often has a hollow core.

A supercontinuum extending into the ultraviolet (UV) range can be generated by light pulses propagating in a gas-filled hollow-core microstructured fiber. Since the light pulses primarily propagate in a region without solid material, intense pulse peak powers may have little effect on the degradation of the fiber material compared to solid-core fibers. However, a window is often arranged to contain the gas within the fiber (core) and this window may also suffer from degradation by high peak power pulses. This degradation may also be kept at a low level by the distribution of the pulse energy over more pulses.

The pulses in the first sequence 13 of light pulses may occur regularly over time. Thus, the pulses of the first sequence 13 of light pulses may occur at a pulse repetition rate R. In some examples, the predetermined time period may be equal to n*T. Here, n is a natural number, such as 1, 2, 3, . . . . Where the pulses in the first sequence of light pulses occur regularly over time, T can be the inverse of the pulse repetition rate R of the pulses of the first sequence 13 of light pulses.

In some examples, the predetermined time period may be equal to T/n where n is larger than 1, such that the predetermined time period is shorter than the time separation between two successive pulses of the first sequence 13 of light pulses.

The second sequence 17 of light pulses may be generated such that more light pulses occur within the same time period. The second number of light pulses can therefore be higher than the first number of light pulses. The second sequence 17 of light pulses is provided to the nonlinear optical element 19 which broadens the pulses and thereby generates broadband or supercontinuum light pulses which are output in a sequence of light pulses from the nonlinear optical element 19.

As the second number of light pulses is preferably higher than the first number of light pulses, using the second sequence 17 of light pulses to generate broadband or supercontinuum light in the nonlinear optical fiber provides the advantage that the peak powers of the pulses in the second sequence of light pulses can be kept at a level that does not damage the nonlinear optical element 19, while the broadband or supercontinuum output of the nonlinear optical element can still be at a high power level. I.e. increasing the number of pulses in the second sequence of pulses received by the nonlinear element within the predetermined time period provides that the total optical power delivered to the nonlinear element within that time period can be increased without the need for increasing the peak power of individual pulses.

Figure 2:
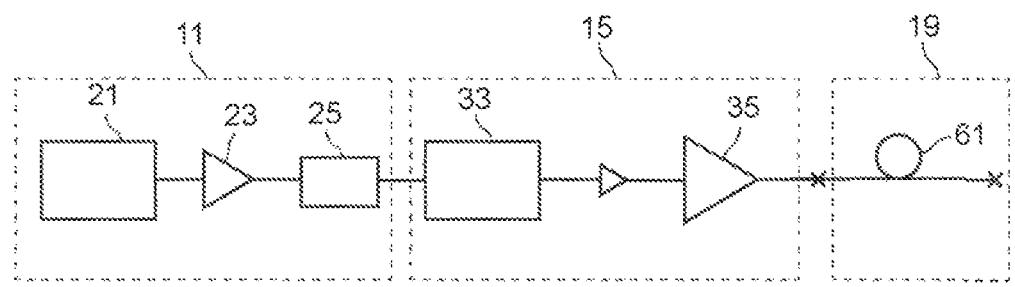
FIG. 2 shows schematically a second example of a light source according to an embodiment.

The light source of FIG. 2 also comprises a pulse generator 11, a manipulator 15, and a nonlinear optical element 19. The pulse generator 11 includes a laser oscillator 21, an amplifier 23, and a pulse picker 25.

Figure 3:
FIGS. 3 to 5 show schematically various sequences of light pulses that occur in the operation of the light source of FIG. 2.

The laser oscillator 21 can be configured to generate an initial sequence of light pulses 27 having a defined repetition rate. FIG. 3 shows schematically a portion of the initial sequence 27 of light pulses in a pulse train diagram as a function of power P over time t.

The initial sequence 27 of light pulses can be amplified by amplifier 23, which increases the power level of the pulses in the initial sequence 27 of light pulses. After amplification, the initial sequence 27 of light pulses is provided to the pulse picker 25 which can selectively pick out pulses from the initial sequence 27 of light pulses. The pulse picker 25 can for example be an acousto-optical or electro-optical modulator.

Figure 4:
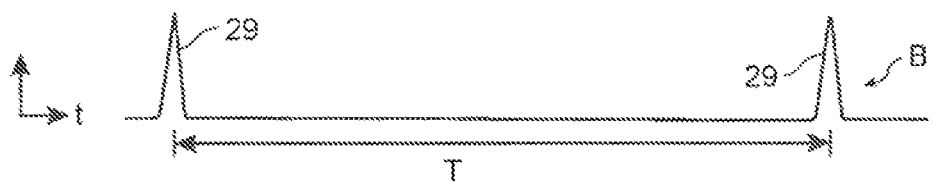

An example of a first sequence of light pulses 13 as output by the pulse picker 25 is schematically shown in FIG. 4, also in form of a pulse train diagram. As can be seen by comparison with FIG. 3, the pulse picker 25 has been configured such that only one in five pulses of the initial sequence 27 of light pulses is provided to the manipulator 15. The remaining pulses may be absorbed in an optical dump arranged in the pulse picker 25. Thus, in the described example, the first sequence of light pulses 13 has a repetition rate which is reduced by a factor of 5 with regard to the repetition rate of the initial sequence 27 of light pulses. A reduction of the repetition rate by any factor such as, for example, 2, 3 or 4, is also possible. It is also possible that the pulse picker 25 is configured to "pick" pulses from the initial sequence 27 of light pulses on an irregular basis, thereby generating the first sequence 13 of light pulses which does not have a defined repetition rate.

As can be seen with regard to FIG. 4, the first sequence 13 of light pulses comprises a first number of light pulses within a predetermined time period T. For example, the predetermined time period can be assumed to be n times the inverse of the pulse repetition rate R of the pulses of the first sequence 13 of light pulses. As illustrated in FIG. 4, n=1, so that T=1/R. This means that there is one pulse in the time period T in the first sequence 13 of light pulses in accordance with the example of FIG. 4.

The first sequence 13 of light pulses is provided to the manipulator 15 which is configured to generate the second sequence 17 of light pulses from the first sequence 13 of light pulses.

Figure 5:
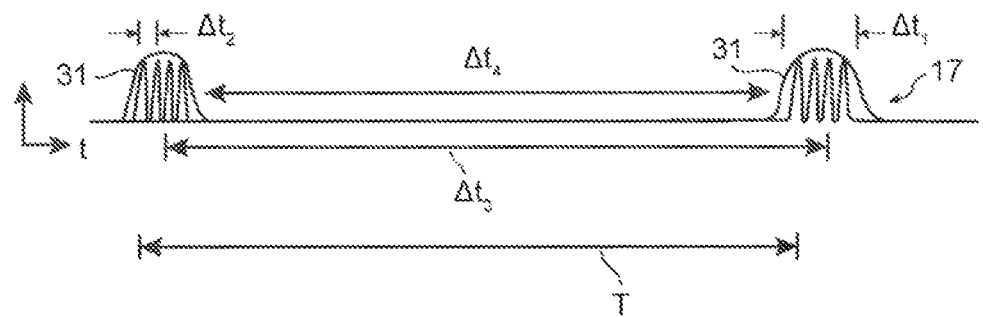

FIG. 5 shows schematically, also in a pulse train diagram, an example of a second sequence 17 of light pulses that is generated from the first sequence 13 of light pulses of FIG. 4. As can be seen in FIG. 5, the manipulator 15 generates from a pulse 29 in the first sequence 13 a burst 31 of pulses which consists of two or more pulses that have a short time delay in between them. Such time delay can also be called inter-burst pulse spacing. Thus, per time period, say T, the number of light pulses in the second sequence 17 of light pulses is larger than the number of light pulses in the first sequence 13 of light pulses. Such a burst 31 of pulses can be detected as a single pulse with a detector having an integration time exceeding the burst duration such that the detector cannot resolve the individual pulses in the burst 31.

In a system for optical analysis, e.g. a spectroscopy or Optical Coherence Tomography system, having a detector with an integration time that exceeds the burst duration, one spectrum will be recorded from the analyzed sample within the burst duration. The light source hence effectively provides a high-power supercontinuum to the analyzed sample making it suitable for use in analysis of weakly reflecting or transmitting samples.

The detector may detect the burst 31 as a relatively long single pulse with high energy, in particular if it includes a plurality of closely spaced pulses. The integration time of the detector can therefore be longer than the duration of a burst 31, but it is smaller than the time T between consecutive bursts 31.

A measure for the duration of a burst can for example be the full-width half-maximum (FWHM) of an intensity or power signal of a burst 31. The FWHM of a burst 31 can for example correspond to the time duration between the half of the maximum power or intensity value of the forward flank of the first pulse and the half of the maximum power or intensity value of the rear flank of the last pulse in a burst. The burst time duration is shown as $\Delta t1$. Autocorrelation/deconvolution techniques can measure the individual pulse profiles.

With reference to FIG. 5, the time between the individual pulses of a pulse burst 31 is shown as $\Delta t2$, which is the time interval between pulse peaks of the pulses within the burst of pulses. Where the pulses within the pulse burst are regularly spaced, the inverse of $\Delta t2$, namely $1/\Delta t2$, corresponds to the repetition rate of the intra-burst pulses.

The time duration $\Delta t3$ between pulse bursts 31 can correspond to the time spacing between peaks of the pulse burst envelope 31, which in principle is equal to the time difference between peaks of the first pulse of each pulse burst 31. The inverse of $\Delta t3$, $1/\Delta t3$, corresponds to the pulse burst repetition rate where the pulse bursts are regularly spaced.

FIG. 5 also shows a time duration between pulse bursts, $\Delta t4$, which can be referred to as the "inter-burst time spacing", and which can be taken as the time difference between the FWHMs points of opposing flanks of consecutive burst pulse envelopes.

The pulse bursts 31 can be considered to have a "power cycle", which can correspond to $\Delta t1$ divided by $\Delta t3$ ($\Delta t1/\Delta t3$). The power cycle can be expressed as a percentage. The value of the power cycle is related to the number of pulses within each pulse burst, which is of course related to the configuration of the manipulator 15.

In certain embodiments of the invention, the pulse burst power cycle is less than, or less than or equal to, a selected value, which selected value can be 10%, 20%, 30%, 40%, 50%, 60%, 70%, 80%, or 90%.

In certain embodiments of the invention, the pulse burst power cycle is greater than, or greater than or equal to, a selected value, which selected value can be 10%, 20%, 30%, 40%, 50%, 60%, 70%, 80%, 90%.

All sensible combinations of the foregoing are considered within the scope of the invention. For example, the power cycle can be less than or equal 80% and greater than or equal to 50%.

In certain embodiments of the invention the ratio of the number of pulses in the second sequence shown in FIG. 5 to the number of pulses in the first sequence shown in FIG. 4 can be greater than or equal to a selected value, with a selected value can be 2, 4, 6, 8,10, 20, 50, 100, or 500.

In certain embodiments of the invention the ratio $\Delta t3/\Delta t2$ can be greater than or equal to selected values, such as greater than or equal to 5, 10, 25, 50, 100, or 1000.

Again, all sensible, that is, not physically nonsensical, combinations of the foregoing embodiments describing selected values and their ranges are within the scope of the invention.

In another non-illustrated example, the manipulator 15 may be configured to generate the second sequence 17 of light pulses such that the second sequence 17 of light pulses has a second repetition rate which is higher than the first repetition rate of the pulses 29 in the first sequence 13. For example, the repetition rate may be two times or four times higher.

For example, the manipulator 15 can be configured to insert a burst of pulses 31 in between the two bursts of pulses 31 shown in FIG. 5, thereby increasing the repetition rate of the bursts of pulses from that shown in FIG. 5.

Figure 6:
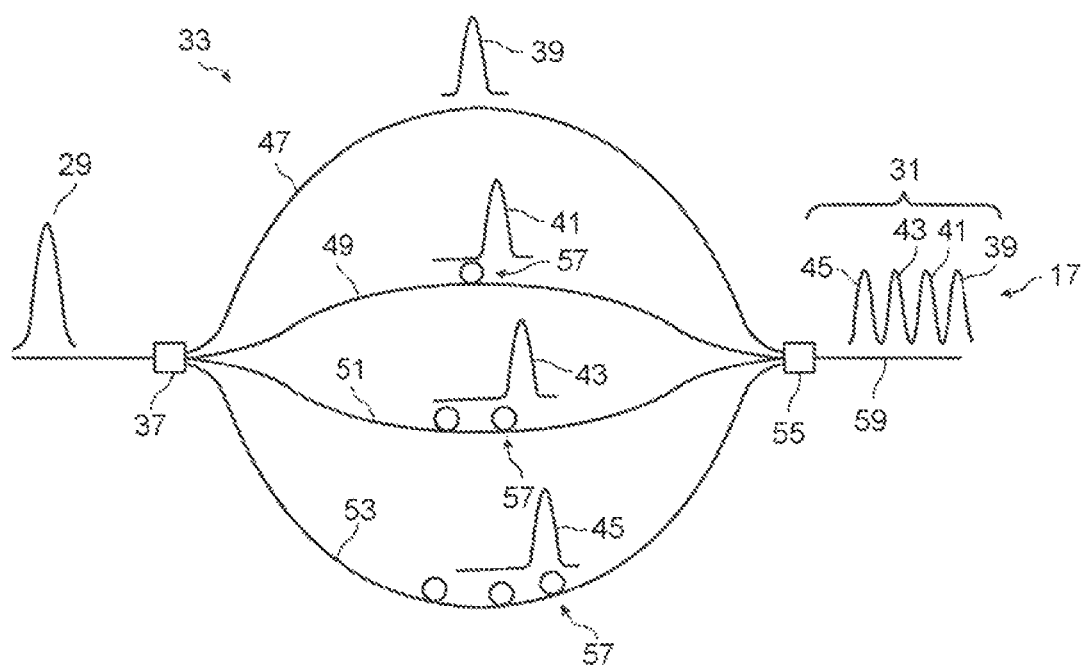
FIG. 6 shows an example of a manipulator employed in the light source of FIG. 2.

The manipulator 15 comprises a time delay device 33 and an amplifier 35. An exemplary embodiment of the time delay device 33 is described with regard to FIG. 6. The time delay device 33 comprises an optical splitter 37 configured to split each pulse 29 of the first sequence 13 into a given number N of pulses. In the described example, N is equal to 4. Thereby, N=4 sub-sequences 39, 41, 43 and 45 of light pulses are generated.

The time delay device 33 further comprises N=4 optical paths of different optical length. The pulse splitter 37 is configured to feed each of the four sub-sequences 39 to 45 of light pulses into one of the optical paths 47 to 53. The optical paths 47 to 53 are realized by optical fibers. Specifically, in the described example, each optical path 47 to 53 comprises a fiber of a defined length that extends between an output port of the optical splitter 37 and an input port of an optical combiner 55. In the first optical path 47, no additional delay line is inserted. In the second optical path 49, one additional delay line 57 is inserted. The delay line 57 consists of a fiber of a defined length. In the third optical path 51 two delay lines 57 are inserted, and in the fourth optical path 53 three delay lines 57 are inserted. The second optical path 49 is therefore one times the length of the delay line 57 longer than the first optical path 47. The third optical path 51 is two times the length of the delay line 57 longer than the first optical path 47. The fourth optical path 53 is three times the length of the delay line 57 longer than the first optical path 47.

The first sub-sequence 39 of light pulses travelling along first optical path 47 arrives earlier at the optical combiner 55 than the second sub-sequence 41 travelling through the second optical path 49. The third sub-sequence 43 of light pulses that travels through the third optical path 51 is still further delayed with respect to the first and second sub-sequence of light pulses. Moreover, the fourth sub-sequence 45 of light pulses is still further delayed as the pulses of the fourth sub-sequence 45 travel through the fourth optical path 53 with three delay lines 57.

The combiner 55 combines the sub-sequences of light pulses 39 to 45 originating from the different optical paths 47 to 53 and thereby generate the second sequence 17 of light pulses in which the incoming pulses from the different optical paths are delayed with respect to each other, such that the second sequence 17 can include bursts 31 of pulses (see also FIG. 5). By varying the number of optical paths and the length of them, it is possible to create different bursts 51 or to multiply the repetition rate of the first sequence 13 of light pulses.

After the generated second sequence 17 of light pulses has passed through amplifier 35, it is provided to the nonlinear optical element 19, which comprises or consists of a highly nonlinear fiber 61. Due to nonlinear effects occurring in the fiber 61, the spectral bandwidth of the pulses is broadened, resulting in a broadband spectrum or a supercontinuum spectrum.

As explained above, the optical paths 47 to 53 can be formed by optical fibers of the same length, with one delay line inserted in the second optical path 49, two delay lines 57 inserted in series into the third optical path 51, and three delay lines 57 inserted in series in the fourth optical path 53. Alternatively, the four optical paths 47 to 53 could be formed by four different optical fibers of different lengths.

The term "light" used herein does not only refer to visible light, but also to light in the non-visible wavelength regimes, including, for example, light in the infrared (IR) or ultraviolet (UV) wavelength regime.

The broadband or supercontinuum light spectrum generated by the nonlinear optical element 19 might comprise a continuous spectrum or might comprise a spectrum having bands of wavelengths which are very closely spaced.

The broadband spectrum generated in the nonlinear fiber may also be a supercontinuum spectrum.

The assignment of elements 21-25, 33-35, 61 of the light source to the components 11, 15, 19 as shown in FIG. 2 can be seen from a formal point of view, and another type of assignment can also be made. For example, the light source of FIG. 2 can be realized by use of three modules. A first module can comprise the laser oscillator 21.

A second module, which can be regarded as an amplifier or preamplifier module, can comprise one or more amplifiers, such as amplifier 23 and a further amplifier, and with the pulse picker 25 and/or the time delay device 33 sandwiched in between the two amplifiers. In some embodiments, the time delay device 33 can also be placed before the one or more amplifiers. The pulse picker 25 preferably resides between the two amplifiers. Preferably, in embodiments which include both, the pulse picker 25 and the time delay device 33, the pulse picker 25 is arranged before the time delay device 33, and both are sandwiched between two amplifiers.

The third module, which can be regarded as a booster module, includes the amplifier 35 and the nonlinear optical element 19. In some embodiments, a pre-amplifier can be arranged before amplifier 35. Optionally, if this pre-amplifier is present in the third module, a second amplifier, which might be arranged in the second module after the time delay device 33, can be removed.

In some embodiments, each of the modules is encased in a separate housing. The housings can be connected to each user by use of optical fibers.

Figure 7:
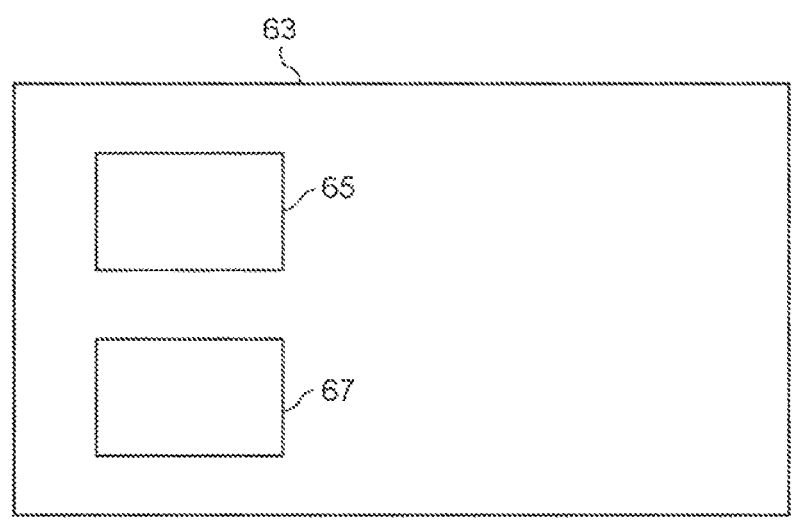
FIG. 7 shows a block diagram of an example of an apparatus for illuminating a material sample.

FIG. 7 shows a block diagram of an example of an apparatus 63 for analyzing a material sample. The apparatus 63 includes a light source 65 for illuminating the material sample, in particular a light source in accordance with an embodiment of the present invention, and a detector 67 for detecting light scattered from or transmitted through the illuminated material sample. The detector 67 preferably has an integration time which is larger than the duration of a burst as provided by the light source 65 but smaller than the time span between two consecutive bursts.

Figure 8:
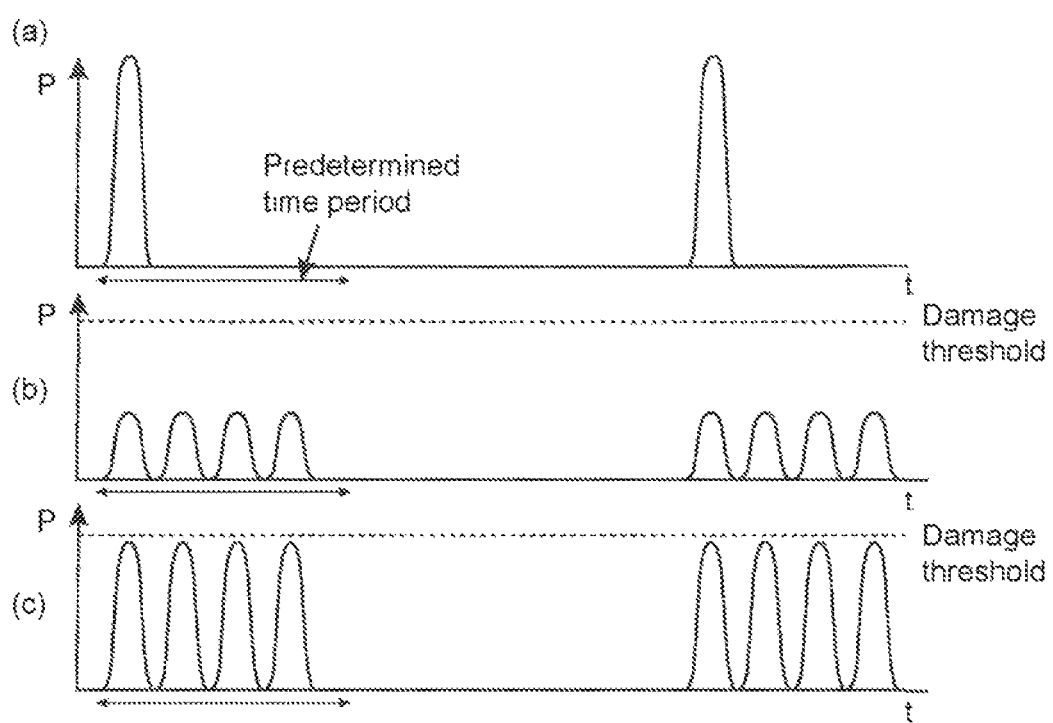
FIGS. 8 and 9 schematically illustrate sequences of light pulses that can occur according to certain practices of a light source according to the present invention.

FIG. 8(a) illustrates as an example two consecutive pulses generated from the pulse generator. By using a number of arms of the first manipulator and delays provided by its arms, it is possible to obtain consecutive trains of pulses with each train having pulses within a predetermined time period as shown in FIG. 8(b). These pulses can then be amplified with one or more amplifiers arranged after the first manipulator as shown in FIG. 8(c) while keeping the peak power below a predefined maximum level, in particular to increase the delivered total power while avoiding an accelerated degradation of the nonlinear optical element. The amplification can provide that the total optical power provided to the nonlinear optical element can be increased with respect to the pulse trains as shown in FIGS. 8(a) and 8(b). Thereby, high-power supercontinuum pulses can be generated without the use of very high peak powers that would quickly degrade the nonlinear optical element.

A detector that might be used to detect the supercontinuum pulses generated from a train of amplified pulses as shown in FIG. 8(c) can have an integration time which is larger than the predetermined time period and, thus, the integration time can be larger than the time length of a train of pulses. The detector detects one supercontinuum pulse while each pulse in a train of pulses might generate an individual supercontinuum pulse. The detected supercontinuum pulse would therefore include the contributions provided by the individual supercontinuum pulses and the detected supercontinuum pulse can thus have a high total power and a large spectral power density or spectral energy density.

Figure 9:
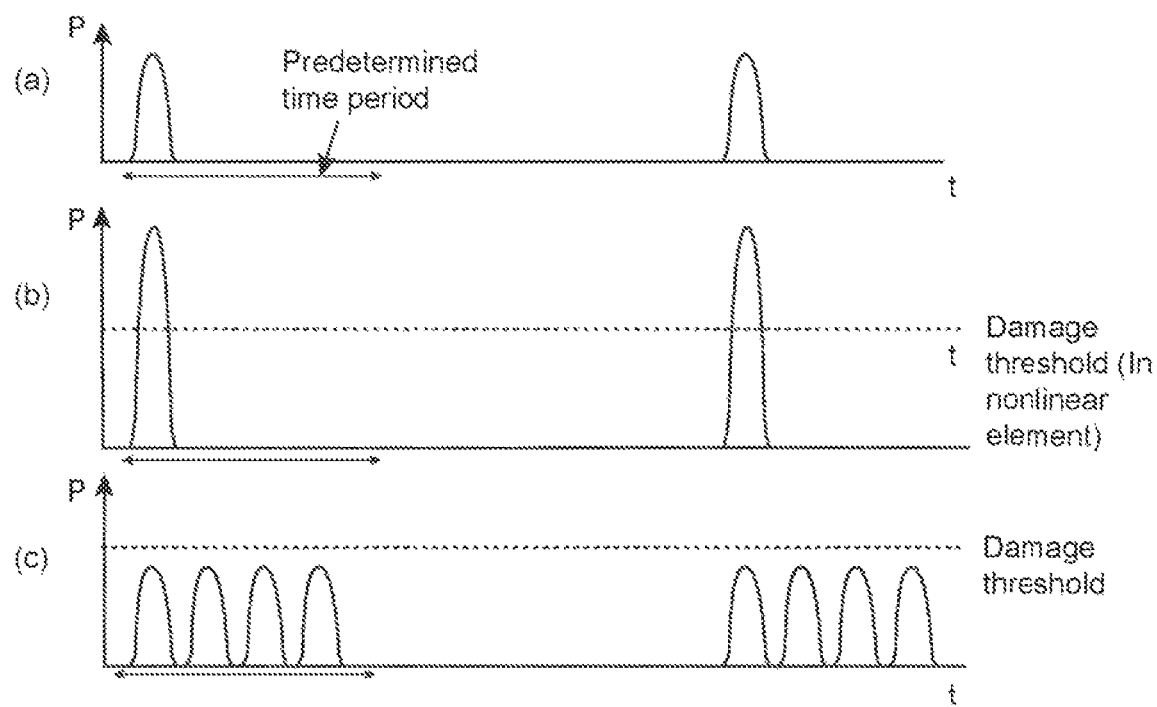

FIG. 9 shows an alternative way of generating the train pulses shown in FIG. 8(c), namely, the initial sequence of light pulses shown in FIG. 9(a) can be amplified with an amplifier arranged after the pulse generator and prior to the first manipulator as shown in FIG. 9(b). Even though such sequence has a peak power above the predefined maximum level, i.e. the damage threshold of the nonlinear optical element, this will not be the case after the manipulator which will multiply the repetition rate of the initial sequence of light pulses shown in FIG. 9(c).

In some embodiments, the embodiments described above do not include the nonlinear element, such the pulses or bursts of pulses are output without being spectrally broadened by the nonlinear element.

Some embodiments and additional features of the present invention are summarized in the following list of items:

1. A light source, comprising:
   a pulse generator for providing a first sequence of light pulses, the first sequence of light pulses having a first number of light pulses in a predetermined time period, the pulse generator further comprising an optical source for producing optical pulses; and
   a modulator in communication with the optical source for increasing or decreasing the first number of pulses provided by the pulse generator in the predetermined time period;
   a manipulator optically downstream of and in optical communication with the pulse generator, the manipulator configured for generating a second sequence of light pulses from the first sequence of light pulses, the second sequence of light pulses having an increased, second number of light pulses in the predetermined time period, where the second number is greater than the first number;
   wherein, responsive to pulse generator in operation with the manipulator, the second sequence of light pulses includes bursts of light pulses having an inter-burst time spacing TB between bursts, wherein a burst includes successive pulses having a time TBP therebetween; and
   wherein TBP<TB, TBP preferably being <TB/2.

2. The light source of item 1, wherein the first sequence of light pulses includes successive pulses having a time T therebetween, and wherein TBP<TB<T.

3. The light source of any one of item 1 or 2, further comprising a nonlinear optical element downstream of and in optical communication with the manipulator and for receiving and spectrally broadening pulses to generate bursts of spectrally broadened pulses.

4. The light source of any one of items 1 to 3, wherein the light source is configured such that TBP can stay substantially the same as TB is varied.

5. The light source of any one of items 1 to 4, wherein said modulator comprises an optical modulator in optical communication with, and located optically downstream of, the optical source.

6. The light source of item 5 wherein said modulator comprises an acousto optical modulator.

7. The light source of any of items 1-4 wherein said modulator electrically modulates the optical source.

8. The light source of any one of items 1 to 7, wherein said optical source comprises a laser diode for generating pulses.

9. The light source of any one of items 1 to 7, wherein said optical source comprises a mode locked fiber laser.

10. The light source of any one of items 1 to 9, wherein said pulse generator can provide light pulses having a maximum repetition rate RMAX and a corresponding time TMIN between the pulses, and wherein the light source can generate said bursts of pulses wherein TBP<TMIN.

11. The light source of any one of the items 1 to 10, wherein the manipulator comprises a pulse splitter configured to split received pulses into N split pulses, and
   wherein the manipulator is configured to provide different time delays to at least some of the N split light pulses.

12. The light source of item 11 wherein the manipulator comprises a pulse combiner (55) which is configured to combine split pulses.

13. The light source of item 11 or 12, wherein the manipulator comprises N optical paths of different optical lengths, wherein the pulse splitter is configured to feed each of the N split pulses of light pulses into one of the N optical paths.

14. The light source of any one of the items 1 to 13, comprising at least one amplifier optically arranged between the optical source of the pulse generator and the manipulator.

15. The light source of any one of the items 3-14, comprising
   at least one amplifier optically arranged between the manipulator and the nonlinear optical element for amplifying the pulses before they are provided to the nonlinear optical element.

16. The light source of item 15, wherein the light source is configured to amplify pulses such that the peak power of the amplified pulses remains below a predefined power threshold level, said threshold level selected to reduce optical damage to the nonlinear element.

17. The light source of item 14 or 15, wherein the light source is configured such that pulses are amplified such the that peak power of amplified pulses is substantially the same or, if not the same, controlled to be below a threshold level, in particular a predefined maximum level, to which they would amplified absent control, including for pulses having different values for TBP and/or pulses of bursts having different values for TB.

18. The light source of any one of the items 3-17, wherein the nonlinear optical element is a nonlinear optical fiber, in particular a microstructured optical fiber.

19. A light source, comprising:
   an optical source for providing pulses at a repetition rate R and a corresponding time T between pulses;
   a pulse picker optical communication with and optically downstream of the optical source for receiving pulses and providing pulses having a reduced repetition rate RRED, where RRED<R;
   a manipulator optically downstream of and in optical communication with the pulse picker for receiving pulses having the repetition rate RRED and for providing pulses having an increased repetition rate RINC, where RINC>R;
   wherein, responsive to optical source in operation with the manipulator, the light source outputs bursts of pulses, in particular received from the manipulator, having a time TB between bursts and wherein a burst includes pulses having a time TBP between the pulses of the burst, and
   wherein TBP<TB<T, where preferably TBP is <TB.

20. The light source of item 19 further comprising a nonlinear optical element downstream of and in optical communication with the manipulator and for receiving pulses having the repetition rate RINC and for spectrally broadening such pulses, wherein the generated bursts of pulses are bursts of spectrally broadened pulses.

21. A light source kit, comprising:
a light source in accordance with any one of the items 1 to 20, in which the manipulator is a first manipulator which is arranged in a first module that is removable from the light source,
wherein the light source kit further comprises at least a second manipulator which is configured to generate a third sequence of light pulses from the first sequence of light pulses,
wherein the second manipulator is arranged in a second module that is configured to replace the first module after removal of the first module from the light source; and
wherein when the second manipulator replaces said first manipulator, said third sequence of pulses comprises said bursts of pulses having said time TB between bursts and said time TBP between said successive pulses of a burst.

21. A light source kit, comprising:
a light source in accordance with any one of the item 1 to 20, in which the manipulator (15) is a first manipulator which is arranged in a first module that is removable from the light source,
wherein the light source kit further comprises at least a second manipulator which is configured to generate a third sequence of light pulses from the first sequence of light pulses, and
wherein the second manipulator is arranged in a second module that is configured to replace the first module after removal of the first module from the light source.

22. An apparatus for illuminating a material sample, in particular for material processing, comprising:
a light source in accordance with any one of the items 1 to 20,
a holder for a material sample, the material sample being held such that the material sample can be illuminated with light emitted by the nonlinear optical element of the light source, and/or
a detector, preferably with an integration time which is longer than the duration of bursts provided by the light source.

23. Use of a light source in accordance with any one of the items 1 to 20 or in accordance with any one of the claims 1 to 10 for carrying out an optical analysis, such as spectroscopy, on a sample material, 24. A method of carrying out spectroscopy on a material sample, the method comprising:
using a light source in accordance with any one of the items 1 to 20 or with any one of the claims 1 to 10 for illuminating a material sample,
detecting light from the material sample, in particular by using a detector which has an integration time that is longer than the time duration of a pulse or a burst of pulses as provided by the light source.

LIST OF REFERENCE SIGNS 11 pulse generator
13 first sequence of light pulses
15 manipulator
17 second sequence of light pulses
19 nonlinear optical element
21 laser oscillator
23 amplifier
25 pulse picker
27 initial sequence of light pulses
29 pulse
31 burst of pulses
33 time delay device
35 amplifier
37 optical splitter
39 first sub-sequence of light pulses
41 second sub-sequence of light pulses
43 third sub-sequence of light pulses
45 fourth sub-sequence of light pulses
47 first optical path
49 second optical path
51 third optical path
53 fourth optical path
55 optical combiner
57 delay line
59 optical fiber
61 nonlinear optical fiber
63 apparatus
65 light source
67 detector
T time period
t time
P power

The invention claimed is:

1. A broadband light source, comprising:
a pulse generator for providing a first sequence of first light pulses;
a manipulator configured to generate a burst of second light pulses comprising at least two second light pulses with a time delay in between the at least two second light pulses generated from a single first light pulse to provide a second sequence of second light pulses from the first sequence of first light pulses; and
a nonlinear optical element arranged to receive the second sequence of second light pulses;
where the second light pulses generate a broadband spectrum or a supercontinuum when propagating through the nonlinear optical element,
wherein a ratio between a time duration between successive bursts ($\Delta t3$) and intra-pulse temporal spacing between the second light pulses in the burst ($\Delta t2$), $\Delta t3/\Delta t2$, is greater than or equal to 5.

2. The light source of claim 1, wherein the at least two second light pulses in the burst have substantially the same peak power.

3. The light source of claim 2, wherein the peak power of the at least two second light pulses in the burst is below a damage threshold of the nonlinear optical element.

4. The light source of claim 1,
wherein the nonlinear optical element is a nonlinear optical fiber.

5. The light source of claim 4,
wherein the nonlinear optical element comprises a gas-filled hollow-core microstructured fiber, and wherein the generated broadband spectrum or supercontinuum extends into the ultraviolet (UV) range.

6. The light source of claim 1,
wherein the light source comprises at least one amplifier.

7. The light source of claim 6,
wherein the amplifier is arranged between the manipulator and the nonlinear optical element for amplifying the second light pulses before they are provided to the nonlinear optical element.

8. The light source of claim 1,
wherein the pulse generator comprises an optical pump source.

9. The light source of claim 6, wherein the pulse generator comprises an optical pump source, wherein the amplifier is arranged between the optical pump source of the pulse generator and the manipulator.

10. The light source of claim 1, wherein
the first sequence of first light pulses has a first number of first light pulses within a predetermined time period, and the second sequence of second light pulses has a second number of second light pulses within the predetermined time period,
where the second number is larger than the first number, and
where the predetermined time period is equal to T/n, where T is the time separation between two successive first light pulses and n is larger than 1.

11. The light source of claim 8,
wherein a pulse picker is arranged between the optical pump source and the manipulator,
wherein the optical pump source is configured to generate an initial sequence of initial light pulses having a defined repetition rate and the pulse picker is configured to reduce the repetition rate of the initial sequence of initial light pulses to form the first sequence of first light pulses.

12. The light source of claim 1,
wherein the light source comprises a detector for detecting at least a portion of the second light pulses before the second sequence of second light pulses is input into the nonlinear optical element, and wherein at least one parameter of the second sequence of second light pulses is controlled based on a signal obtained from the detector.

13. The light source of claim 1,
further comprising a controller to control operation of at least one controllable element of the light source based on a signal obtained from a detection of a portion of the first sequence of first light pulses or the second sequence of second light pulses,
wherein the controllable element is one of the following:
the pulse generator, an amplifier which is arranged between the manipulator and the nonlinear optical element, an amplifier of the pulse generator, and a pulse picker which is arranged between an optical pump source of the pulse generator and the manipulator.

14. The light source of claim 1, wherein the intra-pulse temporal spacing between the second light pulses in the burst ($\Delta t2$) is shorter than 200 ps.

15. The light source of claim 1,
wherein a burst time duration is $\Delta t1$, and where a burst power cycle defined as $\Delta t1/\Delta t3$ is less than 50%.

16. The light source of claim 1,
wherein the manipulator comprises
a pulse splitter configured to split each first light pulse into a given number N of light pulses, thereby generating N sub-sequences of sub light pulses including a first sub-sequence of sub light pulses and N-1 further sub-sequences of sub light pulses, wherein the manipulator is configured to individually delay each of the N-1 sub-sequences of sub light pulses with respect to the first sub-sequence of sub light pulses, and
a pulse combiner which is configured to combine the first sub-sequence of sub light pulses and the individually delayed N-1 sub-sequences of sub light pulses, thereby generating the second sequence of second light pulses.

17. The light source of claim 16,
wherein the manipulator comprises N optical paths of different optical lengths, wherein the pulse splitter is configured to feed each of the N sub-sequences of sub light pulses into one of the N optical paths.

18. The light source of claim 17,
wherein the optical paths are formed by optical fibers.

19. An apparatus for spectroscopic analysis of a material sample, comprising:
a light source according to claim 1,
a detector for detecting light from a material sample during an integration time, the material sample being arrangeable such that the material sample can be illuminated with light emitted by the light source and such that light from the material sample can be detected by the detector.

20. The apparatus of claim 19,
wherein the integration time of the detector exceeds the time duration of the burst of second light pulses generated by the light source.

* * * * *